Feb. 23, 1954 W. C. HELMS, JR 2,669,834
MEANS FOR VARYING THE DISCHARGE AREA OF
THE TAILPIPE OF A JET PROPELLED PLANE
Filed July 19, 1948 2 Sheets-Sheet 1
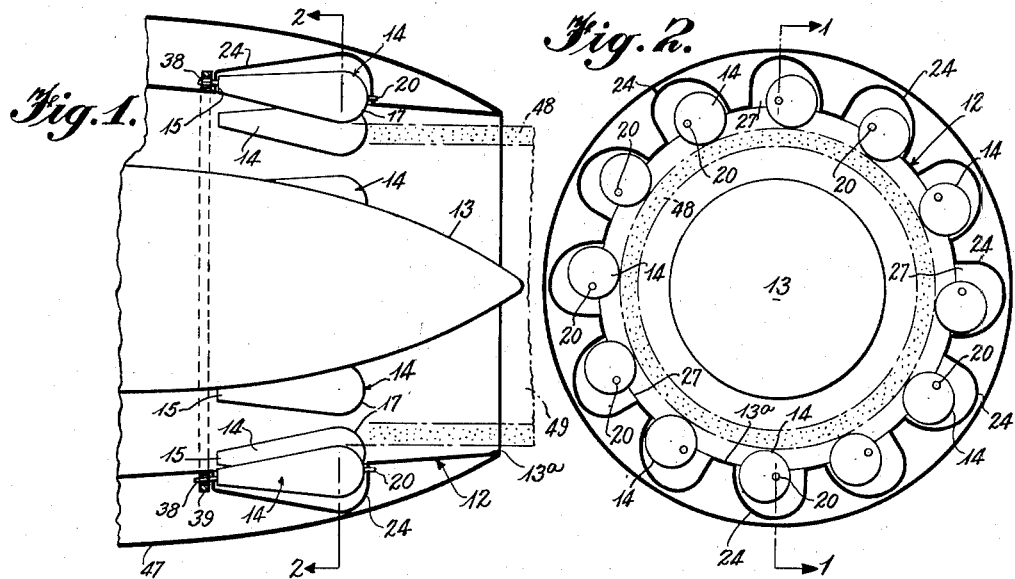
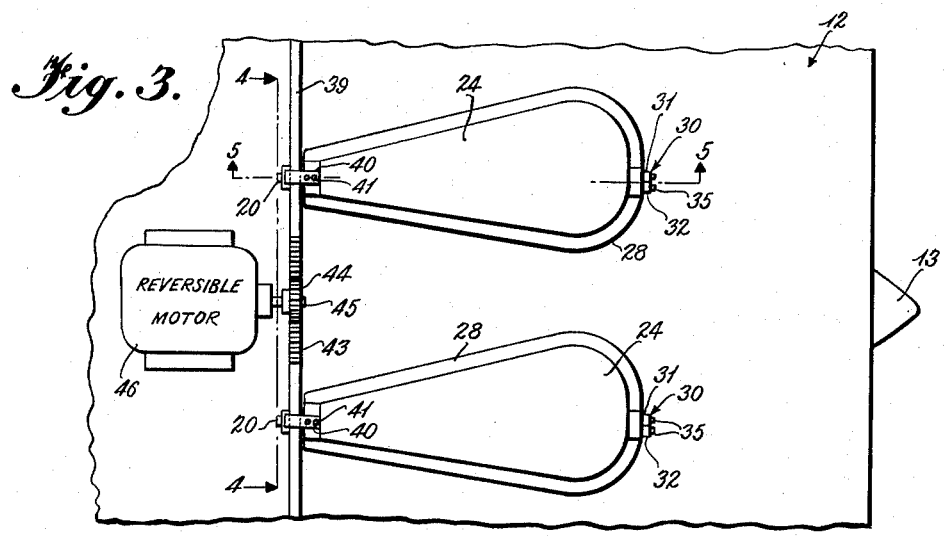
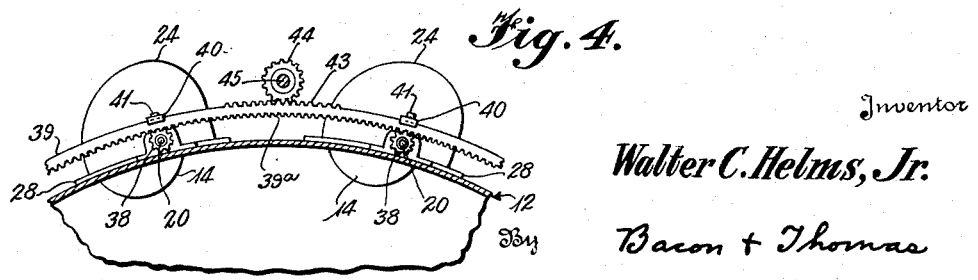
Inventor
Walter C. Helms, Jr.
By Bacon + Thomas
Attorneys

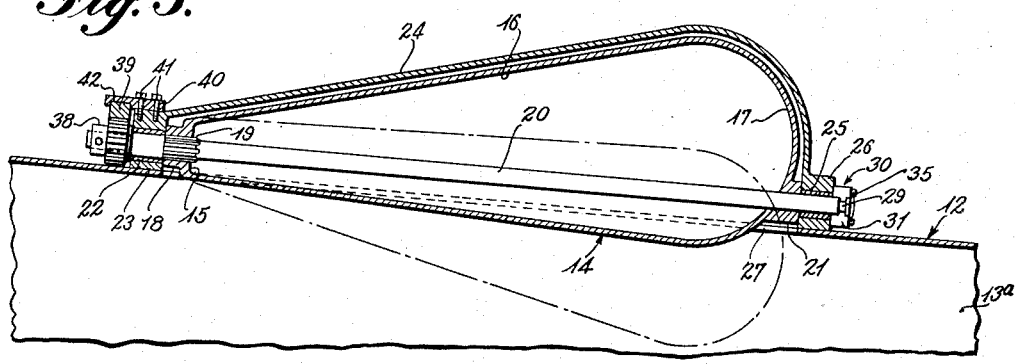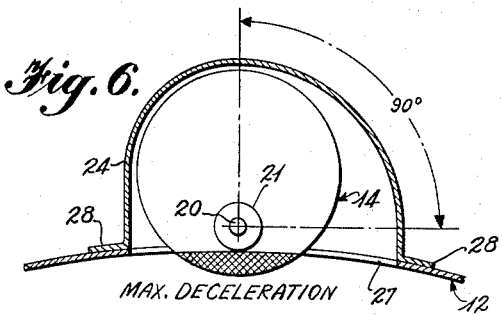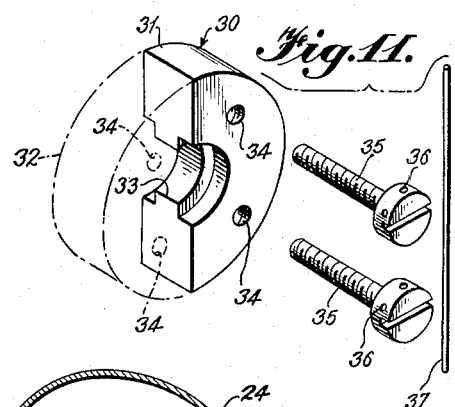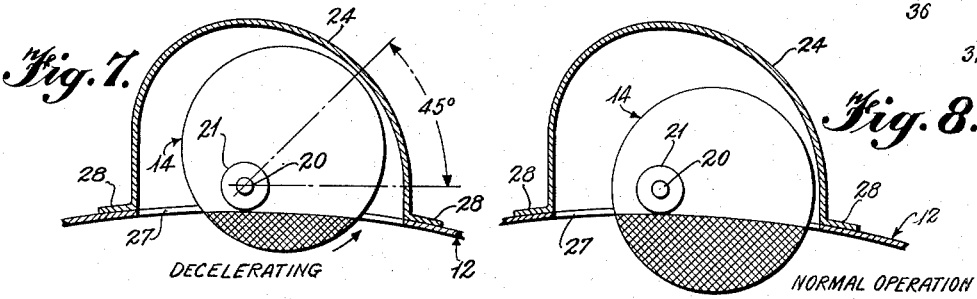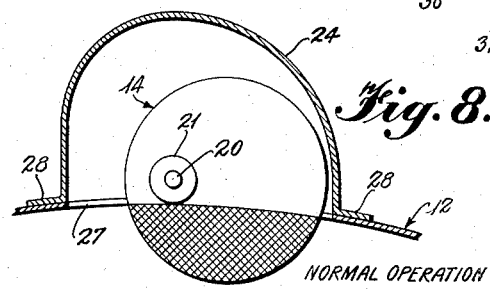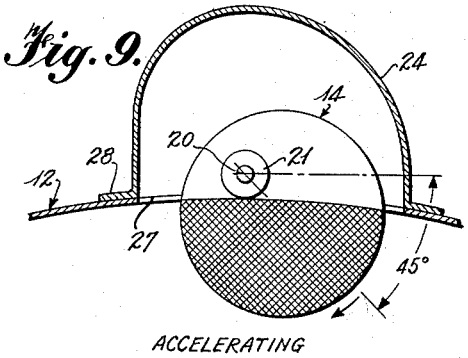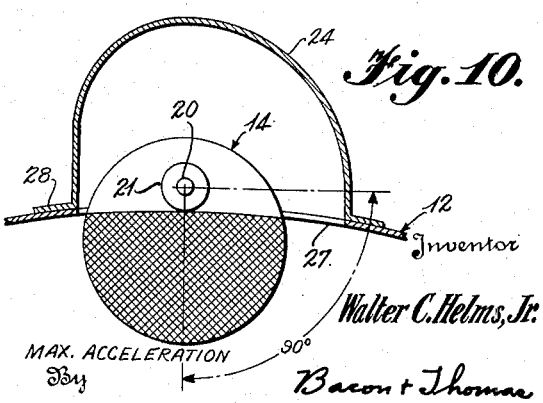

Patented Feb. 23, 1954

2,669,834

UNITED STATES PATENT OFFICE 2,669,834

MEANS FOR VARYING THE DISCHARGE AREA OF THE TAILPIPE OF A JET PROPELLED PLANE

Walter C. Helms, Jr., Annapolis, Md.

Application July 19, 1948, Serial No. 39,475

18 Claims. (Cl. 60—35.5)

The present invention relates to variable nozzle regulating means adapted for general use in regulating the flow of gases through pipes or ducts of various character to vary the flow area of the gas stream and to produce a Venturi effect therein.

The present variable nozzle regulating means is useful in pipes and ducts in industrial chemical processing plants, steam plants, air conditioners, regenerators, etc., to produce a Venturi effect therein and is particularly adapted for use in the tailpipe of a jet propelled airplane to vary the area of the discharging exhaust gas stream and to increase its velocity. In short, the invention is useful wherever it is desired to vary the area and velocity of a moving stream of gas, irrespective of whether the gas is merely flowing through a pipe line or is discharging into the atmosphere.

By way of illustration only, and not limitation, the variable nozzle regulating means is disclosed and illustrated herein in connection with the tailpipe of a jet propelled plane, wherein it is particularly adapted to vary the exhaust gas discharge nozzle area of the tailpipe to change the thrust of the discharging gas jet. Thus, a decrease or increase in jet exhaust nozzle area will respectively effect an increase or decrease in the thrust for any given throttle setting. An increase in thrust is desirable during takeoff, climbing, and in order to maintain maximum speed; whereas, a decrease in thrust is desirable during landing and to reduce speed during flight. A variable thrust control, operable at the will of the pilot, is desirable at all times to enable the pilot to better control the plane.

It is well known that jet propelled planes having fixed area exhaust nozzles are adapted for efficient operation only at a given predetermined speed and altitude, and leave much to be desired in the way of maneuverability and control at various other speeds and altitudes, and in takeoffs and landings.

The principal object of the invention is to overcome the disadvantages inherent in jet propelled planes having fixed area exhaust nozzles, by providing means which will operate rapidly to increase the thrust of the discharging jet and thereby provide for rapid acceleration, especially desirable during takeoff, without causing excessive temperatures or "hot starts," and which is also rapidly operable to produce a substantial reduction in the thrust of the discharging jet to facilitate maneuverability and landing at safe speeds.

A very important object of the invention is to provide a variable nozzle regulator for a jet propelled plane which is actuatable from a condition providing normal operation, to conditions of maximum acceleration and deceleration, respectively.

Another object of the invention is to provide means operable at will for varying the area of the discharge nozzle of a jet propelled plane so that the desired control and high efficiency can be maintained under all conditions of operation of the plane.

Another object of the invention is to provide a variable nozzle regulating means which will produce a Venturi effect in the tailpipe of a jet propelled plane, or any other gas conduit, and thereby increase the velocity of the gas stream.

Another object of the invention is to provide variable regulating means for the exhaust gases of a jet propelled plane which will produce a component in the exhaust stream of a higher speed external boundary layer surrounding an inner jet stream of slightly less speed, to thereby create a high degree of wake efficiency.

Still another object of the invention is to provide variable regulator means for controlling the flow of gases in any conduit, pipe, tube, stack, exhaust gas muffler, etc.

A further object of the invention is to provide gas flow regulating means comprising a plurality of regulators and means for operating said regulators in synchronism.

Other objects and advantages of the invention will be apparent from the following description taken in conjunction with the accompanying drawings, in which:

Fig. 1 is a schematic longitudinal sectional view of the discharge end of a jet plane tailpipe embodying the variable nozzle regulating means of the present invention shown in normal operating position, taken on the line 1—1 of Fig. 2;

Fig. 2 is a schematic transverse sectional view taken on the line 2—2 of Fig. 1;

Fig. 3 is a fragmentary plan view of the exterior of the tailpipe particularly illustrating the reversible motor and ring gear for actuating the nozzle regulators in synchronism;

Fig. 4 is a fragmentary sectional view taken on the line 4—4 of Fig. 3;

Fig. 5 is an enlarged longitudinal sectional view through one of the regulators, taken on the line 5—5 of Fig. 3, but showing the regulator in full lines in a position of maximum deceleration, and in dot-and-dash lines in a position of maximum acceleration;

Figs. 6 to 10, inclusive, are schematic views illustrating by crisscross hatching the extent of reduction of the area of the tailpipe that can be effected by adjusting a regulator to different angular positions; and Fig. 11 is a perspective view of a split collar and fastening means therefor, which is associated with one end of a regulator supporting shaft.

Referring now to Figs. 1 and 2 of the drawings, the numeral 12 generally identifies the tailpipe of a jet propelled plane which tapers or converges in a direction aft. The tailpipe 12 provides a passageway for a high velocity exhaust gas stream and contains a conventional turbine or engine (not shown) having a conical tailpiece 13 extending therefrom and projecting through the exhaust nozzle or orifice 13a of said tailpipe. A plurality of elongated regulators 14 are uniformly, circumferentially spaced about the side wall of the tailpipe 12, as is best shown in Fig. 2. The number of regulators 14 employed will vary with different plane designs and may consist of one or any suitable number. The regulators 14 are identical and a description of one will therefore suffice for all.

Each regulator 14 has a suitable streamlined aerodynamical configuration shown herein by way of example as circular in transverse cross-section, and generally cone-shaped or teardrop-like in a longitudinal direction. It is to be understood that the transverse and longitudinal configuration of the regulator 14 can be varied as desired to meet particular flight requirements. The regulator 14 is preferably made hollow, as best shown in Fig. 5, in order to minimize weight. Each of the regulators 14 includes a small-diameter end wall 15 at its forward end, a tapered side wall 16 diverging aft from said end wall, and a relatively large, substantially semi-spherical end wall 17 at its aft end. It is contemplated that in certain installations the large end wall 17 will be disposed forward instead of aft. The end wall 15 carries a boss 18, which is grooved to receive the splines 19 on an operating shaft 20 and the end wall 17 is provided with a boss 21 through which the shaft 20 extends. It will be noted that the boss 21 is offset from the center of the end wall 17 so that the axis of the shaft 20 is disposed eccentrically with respect to the true axis of the regulator 14. Thus, the regulator 14 is eccentrically rotated when the shaft 20 is turned and is moved laterally toward and away from the axis of the tailpipe 12, as will appear more fully hereinafter.

One end of the shaft 20 is rotatably supported in a bushing 22 (Fig. 5) mounted in one end wall 23 of a regulator housing 24 and the opposite end of said shaft is rotatably supported in a similar bushing 25 mounted in the other end wall 26 of said housing. It is to be understood that sealed ball or roller bearings may be employed in lieu of the bushings 22 and 25 to minimize friction in the supporting means for the shaft 20. The housing 24 overlies an elongated, longitudinally extending opening 27 in the tailpipe 12 through which a portion of the regulator 14 is adapted to extend at all times. The housing 24 is provided with flanges 28, which engage the outer surface of the tailpipe 12 and may be flush-riveted or otherwise suitably secured thereto to form a closure for the opening 27 and a casing for the regulator 14.

The end portion of the shaft 20 adjacent the end wall 26 (Fig. 5) of the housing 24 is provided with a groove 29 adapted to cooperate with a split collar 30 (best shown in Fig. 11) comprising sections 31 and 32, the latter of which is shown in dot-and-dash lines in Fig. 11. Each of the collar sections 31 includes an arcuate ridge 33 adapted to be received in the groove 29 to prevent longitudinal movement between the shaft 20 and the collar 30. Each of the collar sections 31 and 32 is also provided with a pair of holes 34, each adapted to receive a cap screw 35, which is threaded into the end wall 26 of the housing 24 to serve the dual purpose of maintaining the collar sections 31 and 32 assembled with the shaft 20 and preventing longitudinal movement of the shaft 20 relative to the housing 24. The heads of the cap screws 35 are provided with one or more drilled holes 36 through which a wire 37 is adapted to be threaded and then suitably twisted to retain the cap screws 35 locked in their tightened position. The opposite end of the shaft 20 has a spur gear 38 keyed thereon, or formed integral therewith, in any suitable manner.

It will be apparent that in assembling the regulator 14 in the housing 24, the regulator 14 is inserted within the housing 24 and the grooved end of the shaft 20 is inserted through the bushing 22 and through the end walls 15 and 17 of the regulator 14 and then through the bushing 25. Meanwhile, the splines 19 will have engaged with the spline grooves in the regulator end wall 15, and the groove 29 will be disposed outwardly of the end wall 26 of the housing 24 so that the split collar 30 can be mounted on the shaft 20 and secured to the end wall 26.

A ring gear 39 having internal teeth 39a (Fig. 4) meshing with the teeth of the spur gears 38 is arranged so as to simultaneously actuate all of the regulators 14 in synchronism. The ring gear 39 is held in operative position by a bracket 40 secured to each housing 24 by cap screws 41 and provided with a groove 42 (Fig. 5) for rotatably receiving the outer periphery of said ring gear therein. The ring gear 39 is also provided with external teeth 43 (Figs. 3 and 4) on a portion of its outer periphery adapted to be engaged with the teeth of a gear 44 mounted upon a shaft 45. The shaft 45 can be rotated by any suitable means, such as a mechanical linkage and lever system (not shown), but is preferably driven by a conventional reversible motor 46 having a suitable built-in reduction gear. The motor 46 may be an electric motor, or air or hydraulically operated, and adapted to be manually controlled by means (not shown) convenient to the plane pilot. The motor 46 is bolted or otherwise secured to the outer surface of the tailpipe 12 adjacent the ring gear 39. The tailpipe 12, housings 24, ring gear 39 and motor 46 are all enclosed by a shell 47 (Fig. 1) surrounding said tailpipe.

It will be noted that each of the regulators or modified air foils 14 is arranged so that the small end 15 thereof is pointed upstream or into the oncoming jet exhaust stream, while the large end 17 thereof extends aft so as to create the greatest pressure drop or velocity increase at a point farthest aft, or near the nozzle extremity. It will also be noted that, in view of the off-center or eccentric mounting of the regulators 14 on the longitudinal shafts 20, as the shafts 20 are rotated, each regulator 14 will be projected bodily laterally from the full line position shown in Fig. 5 to the dot-and-dash line position shown in said figure. Thus, a variable deflector surface is provided effecting a restricted or expanded area within the tailpipe 12 simply by the rotation of the regulators 14 to move the same laterally into or out of the jet exhaust stream.

The propelling jet emanates in stream-line flow with the thrust varying according to the position of the regulators 14 to provide the desired acceleration or deceleration. Thus, Fig. 8 diagrammatically illustrates the position of one of the regulators 14 relative to the tailpipe 12 when normal operation is desired. The extent of projection of the regulator 14 into the gas stream is indicated by the crisscross hatched area. Under conditions requiring acceleration, such as during climbing or takeoff, the control means for the motor 46 may be actuated to effect driving of said motor in a manner to cause simultaneous clockwise rotation of the regulator 14 to effect movement thereof from a position indicated in Fig. 8 to that shown in Fig. 9. If still further acceleration is required, the motor 46 may be again started or continued in operation until the regulators 14 assume their position of greatest penetration into the exhaust stream to provide for maximum acceleration, as indicated by the position of the regulator 14 shown in Fig. 10. In both Figs. 9 and 10, the crisscross hatched area of the regulator 14 indicates the degree of penetration of the regulator into the discharging gas jet. On the other hand, if it is desired to decelerate from the normal operating position shown in Fig. 8, the thrust of the propelling jet can be reduced by enlargement of the area of said jet by starting the motor 46 to effect rotation of the regulators 14 in a reverse or counterclockwise direction from the position indicated in Fig. 8 to that indicated in Fig. 7. If still further deceleration is required, the motor 46 may be restarted, or continued in operation, to move the regulator 14 from the position shown in Fig. 7 to that shown in Fig. 6, which latter position corresponds to maximum deceleration. The areas of crisscross hatching in Figs. 6 and 7 show different degrees of penetration of the regulator into the gas stream during deceleration.

While Figs. 6 and 7 illustrate rotation of the regulator 14 in a counterclockwise direction from normal position, through an angle of 45° and 90°, respectively, from the position shown in Fig. 8; and while Figs. 9 and 10 illustrate rotation of said regulator clockwise through an angle of 45° and 90°, respectively, from the normal position shown in Fig. 8, it will be understood that the maximum angle of rotation may be varied to any degree as desired to meet the requirements of any particular jet plane design. It will also be apparent that the regulators 14 can be moved directly from any position of acceleration to any position of deceleration, and vice versa, as operating conditions may require.

One of the important features of the invention is that the regulators 14 provide a high velocity exhaust jet which will, in effect, have a component jet stream made up of a dense high speed external boundary layer or ring 48, Figs. 1 and 2, surrounding a core or inner jet stream 49, which is relatively less dense and of a slightly lower speed. The boundary layer 48 being of higher velocity and greater density than the core 49, substantially eliminates the tendency of the propelling jet to immediately expand laterally or eddy upon issuing from the nozzle orifice 13ᵃ and thus creates a high degree of wake efficiency. However, it will be apparent that the regulators 14 may occupy any position in which they may be employed to adjustably constrict the outlet of the exhaust pipe. For example, regulators 14 along with their associated housings and control mechanism may be positioned within the inner tail cone 13 so as to adjustably project into the exhaust stream and such regulators may be employed either alone or in conjunction with similar regulators in the outer tail pipe.

It will be understood that the shape or streamlining of the regulators 14 may be varied to obtain any desired operating characteristics. It is also contemplated that the regulators 14 can be automatically, instead of manually, controlled in accordance with the turbine temperature, or altitude, or engine R. P. M.

It will also be understood that the details of construction of the regulator housing, the mounting means for the regulators, and the means for operating the regulators in synchronism may be varied without departing from the spirit of the invention or the scope of the annexed claims.

I claim:

1. In a jet propelled plane, a tailpipe having a longitudinal passageway extending therethrough providing a discharge nozzle for a high velocity gas stream; a regulator for varying the area of said discharge passageway to alter the thrust of the gas stream discharge therefrom to the atmosphere; means on said tailpipe supporting said regulator for rotation about an axis extending lengthwise of said tail pipe for projection laterally relative to said passageway; and means for rotating and thereby projecting said regulator laterally into and out of said passageway.

2. In a jet propelled plane, a tailpipe having a longitudinal passageway extending therethrough providing a discharge nozzle for high velocity gas; a plurality of regulators for varying the area of said discharge passageway to alter the thrust of the gas stream discharge therefrom to the atmosphere; means on said tailpipe supporting each of said regulators for rotation about an axis extending lengthwise of said tailpipe for projection laterally into and out of said passageway; and means for simultaneously actuating said supporting means to operate said regulators in synchronism.

3. In a jet propelled plane, a tailpipe having a longitudinal passageway extending therethrough providing a discharge nozzle for a high velocity gas stream; a regulator extending longitudinally along the side wall of said tailpipe and operable by movement laterally into and out of said passageway for varying the area of said discharge passageway to alter the thrust of the gas stream discharged therefrom to the atmosphere; means supporting said regulator for rotation about an axis extending lengthwise of said tailpipe for projection laterally relative to said passageway; and means for projecting said regulator laterally into and out of said passageway.

4. In a jet propelled plane, a tailpipe having a passageway providing a discharge nozzle for a high velocity gas stream, said tailpipe having a longitudinal opening extending through the side wall thereof; a streamlined regulator extending longitudinally of said tailpipe in registration with said opening; means exteriorly of said opening forming a closure for said opening, said regulator being operable by movement toward and away from the axis of said tailpipe for varying the area of said discharge passageway to alter the thrust of the gas stream discharged therefrom to the atmosphere; and means supporting said regulator for rotation about an axis extending lengthwise of said tailpipe and for movement through said opening toward and away from the axis of said tailpipe.

5. In a jet propelled plane, a tailpipe having a passageway providing a discharge nozzle for a high velocity gas stream, said tailpipe having an opening extending longitudinally thereof; a housing exteriorly of said tailpipe forming a closure for said opening; a streamlined regulator in said housing; means supporting said streamlined regulator for rotation about an axis extending lengthwise of said tailpipe for projection laterally through said opening into said passageway; and means for actuating said last-mentioned means.

6. In a jet propelled plane, a tailpipe having a passageway providing a discharge nozzle for a high velocity gas stream, said tailpipe having at least one elongated opening in the side wall thereof; a housing exteriorly of said tailpipe forming a closure for said opening; a regulator received in said housing and having a portion of its periphery projecting through said opening into said passageway to reduce the cross-sectional area of said passageway; a shaft eccentrically supporting said regulator in said housing; and means for effecting rotation of said shaft to project said regulator into said passageway to different degrees.

7. In a jet propelled plane, a tailpipe having a passageway forming a discharge nozzle for a high velocity gas stream, said tailpipe having a longitudinally extending opening in the side wall thereof; an elongated regulator arranged in said opening, said regulator being larger in size at one end thereof than at the other end thereof; a housing exteriorly of said tailpipe forming a closure for said opening and enclosing said regulator; means eccentrically mounting and rotatably supporting said regulator in the opening of said housing; and means for rotating said supporting means, whereby said regulator may be projected through said opening into said passageway to varying degrees.

8. In a jet propelled plane, a tailpipe having a passageway forming a discharge nozzle for a high velocity gas stream, said tailpipe having a longitudinally extending opening in the side wall thereof; a regulator of generally teardrop formation arranged lengthwise in said opening; a housing exteriorly of said tailpipe forming a closure for said opening and enclosing said regulator; means eccentrically mounting and rotatably supporting said regulator in the opening of said housing; and means for rotating said supporting means, whereby said regulator may be projected through said opening into said passageway to varying degrees.

9. In a jet propelled plane, a tailpipe having a passageway providing a discharge nozzle for a high velocity gas stream; a regulator carried by said tailpipe for varying the area of said discharge passageway to alter the thrust of said gas stream, said regulator being generally coneshaped with its small end disposed upstream; means supporting said regulator for rotation about an axis offset from the axis of the cone and arranged to project said regulator into said passageway to varying degrees; and means for rotating said supporting means.

10. In a jet propelled plane, a tailpipe having a passageway providing a discharge nozzle for high velocity exhaust gas; means for varying the area of said discharge passageway to alter the thrust of the exhaust gas stream, said means comprising a shaft extending longitudinally relative to said passageway, and a regulator member of generally conical shape eccentrically mounted upon said shaft, said tailpipe having an opening communicating with said passageway and through which said regulator member is adapted to be projected into said passageway by rotation thereof; a regulator housing disposed exteriorly of said tailpipe forming a closure for said opening; and means for rotating said shaft.

11. In a jet propelled plane, a tailpipe having a passageway providing a discharge nozzle for a high velocity gas stream; a plurality of regulators carried by said tailpipe; means supporting said regulators for simultaneous projection into said gas stream to vary the area thereof, said regulators decreasing in cross sectional dimension from a portion intermediate the ends thereof toward said ends to produce a Venturi effect in said passageway; and means for simultaneously operating said regulators.

12. In a jet propelled plane, a tailpipe having a passageway providing a discharge nozzle for a high velocity gas stream, said tailpipe having at least one elongated, longitudinally extending opening in the side wall thereof; a housing exteriorly of said tailpipe forming a closure for said opening; a tapered regulator received in said housing and having a portion of its periphery projecting through said opening into said passageway to reduce the cross-sectional area thereof; a shaft rotatably mounted in said housing and disposed substantially parallel with the side wall of said tailpipe, said shaft eccentrically supporting said regulator in said housing; means securing said shaft against longitudinal movement relative to said housing; and means for effecting rotation of said shaft to project said regulator into said passageway to different degrees.

13. In a jet propelled plane, a tailpipe having a passageway providing a discharge nozzle for a high velocity gas stream, said tailpipe having at least one elongated, longitudinally extending opening in the side wall thereof; a housing exteriorly of said tailpipe forming a closure for said opening; a generally cone-shaped regulator received in said housing and having a portion of its periphery projecting through said opening into said passageway to reduce the cross-sectional area thereof; a shaft eccentrically supporting said cone-shaped regulator in said housing; means securing said shaft against longitudinal movement relative to said housing, said means comprising a groove formed in said shaft adjacent one end of said housing, a split collar having sections each provided with a ridge projecting into said groove, cap screws securing the respective collar sections to said one end of said housing, and means for locking said cap screws against inadvertent rotation; and means for effecting rotation of said shaft to project said regulator into said passageway to different degrees.

14. In a jet propelled plane, a tailpipe having a passageway providing a discharge nozzle for a high velocity gas stream, said tailpipe having a plurality of longitudinal, circumferentially spaced, elongated openings formed in the side wall thereof; a housing exteriorly of said tailpipe forming a closure for each of said openings; an elongated streamlined regulator in each of said housings adapted to be projected inwardly through the opening associated with its housing; a shaft rotatably supported in each of said housings and extending eccentrically through the regulator disposed therein; a gear mounted upon one end of each of said shafts; a ring gear surrounding said tailpipe and having internal teeth meshing with the gear on the respective shafts; and means for rotating said ring gear to simultaneously actuate all of said regulators.

15. In a jet propelled plane, a tailpipe having a passageway providing a discharge nozzle for a high velocity gas stream, said tailpipe having a plurality of longitudinal, circumferentially spaced, elongated openings formed in the side wall thereof; a housing exteriorly of said tailpipe forming a closure for each of said openings; an elongated streamlined regulator in each of said housings adapted to be projected inwardly through the opening associated with its housing; a shaft rotatably supported in each of said housings and extending eccentrically through the regulator disposed therein; a gear mounted upon one end of each of said shafts; a ring gear surrounding said tailpipe and having internal teeth meshing with the gears on the respective shafts, said ring gear having external teeth on at least a portion of the periphery thereof; a pinion meshing with said external teeth; and a reversible motor connected with said pinion for driving said ring gear in opposite directions.

16. In a jet propelled plane, a tailpipe having a passageway providing a discharge nozzle for a high velocity gas stream, said tailpipe having a plurality of longitudinal, circumferentially spaced, elongated openings formed in the side wall thereof; a housing exteriorly of said tailpipe forming a closure for each of said openings; an elongated streamlined regulator in each of said housings adapted to be projected inwardly through the opening associated with its housing; a shaft rotatably supported in each of said housings and extending eccentrically through the regulator disposed therein; means securing one end of each of said shafts against longitudinal movement relative to its associated housing; a gear mounted upon the opposite end of each of said shafts; a ring gear surrounding said tailpipe and having internal teeth meshing with the gears on the respective shafts, said ring gear having external teeth on at least a portion of the periphery thereof; a pinion meshing with said external teeth; and a reversible motor connected with said pinion for driving said ring gear in opposite directions.

17. A fluid flow regulating device, comprising: a tube having a passageway for fluid, said tube having an elongated opening in the side wall thereof; a housing exteriorly of said tube forming a closure for said opening; a streamlined regulator in said housing; means eccentrically supporting said regulator for rotation about an axis generally parallel with said passageway; and means for rotating said regulator about said axis to project a portion of said regulator into said passageway.

18. A fluid flow regulating device, comprising: a tube having a passageway for fluid, said tube having an elongated opening in the side wall thereof; a regulator; means eccentrically supporting said regulator in said opening for rotation about an axis generally parallel with said passageway; and means for rotating said regulator about said axis to project a portion of said regulator into said passageway.

WALTER C. HELMS, Jr.

References Cited in the file of this patent

UNITED STATES PATENTS

| Number | Name | Date |
|---|---|---|
| 177,239 | Haley | May 9, 1876 |
| 340,237 | Nagel et al. | Apr. 20, 1886 |
| 2,342,262 | Franz et al. | Feb. 22, 1944 |
| 2,472,949 | Jackson | June 14, 1949 |
| 2,540,594 | Price | Feb. 6, 1951 |
| 2,563,745 | Price | Aug. 7, 1951 |
| 2,564,671 | Brown | Aug. 21, 1951 |

FOREIGN PATENTS

| Number | Country | Date |
|---|---|---|
| 623,163 | France | Mar. 14, 1927 |
| 25,641 | Great Britain | Nov. 8, 1912 |
| 577,949 | Great Britain | June 6, 1949 |